(12) United States Patent
Liao et al.

(10) Patent No.: US 8,005,998 B2
(45) Date of Patent: Aug. 23, 2011

(54) METHOD FOR CONTROLLING POWER CONSUMPTION OF A USB MASS STORAGE, ASSOCIATED PERSONAL COMPUTER, AND STORAGE MEDIUM STORING AN ASSOCIATED USB MASS STORAGE DRIVER

(75) Inventors: Jen-Hung Liao, Taichung (TW); Chang-Hao Chiang, Hsinchu (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 221 days.

(21) Appl. No.: 12/408,716

(22) Filed: Mar. 22, 2009

(65) Prior Publication Data

US 2010/0241883 A1 Sep. 23, 2010

(51) Int. Cl.
*G06F 3/00* (2006.01)
(52) U.S. Cl. ........... 710/15; 710/5; 710/6; 710/7; 710/8; 710/18; 710/19; 710/20
(58) Field of Classification Search ................... 710/5, 6, 710/7, 8, 15, 18, 19, 20
See application file for complete search history.

(56) References Cited

U.S. PATENT DOCUMENTS

| 2004/0260957 A1* | 12/2004 | Jeddeloh et al. | 713/300 |
| 2007/0294464 A1* | 12/2007 | Squires et al. | 711/100 |
| 2008/0244109 A1* | 10/2008 | Lee et al. | 710/19 |
| 2009/0100217 A1* | 4/2009 | Battaglia et al. | 711/103 |
| 2009/0240846 A1* | 9/2009 | Keller, Jr. | 710/19 |

* cited by examiner

*Primary Examiner* — Tariq Hafiz
*Assistant Examiner* — Jasjit Vidwan
(74) *Attorney, Agent, or Firm* — Winston Hsu; Scott Margo

(57) ABSTRACT

A method for controlling power consumption of a Universal Serial Bus (USB) Mass Storage is provided. The USB Mass Storage is electrically connected to a USB port. The method includes: monitoring at least one Test Unit Ready (TUR) command from an operating system (OS) to the USB Mass Storage; and when it is detected that there is no other command from the OS to the USB Mass Storage for a predetermined time period, controlling the USB port to enter a suspend mode in order to save power supplied to the USB Mass Storage. An associated personal computer and a storage medium storing an associated USB Mass Storage driver for controlling power consumption of the USB Mass Storage are further provided, where the personal computer includes the storage medium. In particular, when the USB Mass Storage driver is executed by the personal computer, the personal computer operates according to the method.

18 Claims, 4 Drawing Sheets

METHOD FOR CONTROLLING POWER CONSUMPTION OF A USB MASS STORAGE, ASSOCIATED PERSONAL COMPUTER, AND STORAGE MEDIUM STORING AN ASSOCIATED USB MASS STORAGE DRIVER

BACKGROUND OF THE INVENTION

1. Field of the Invention

The present invention relates to Universal Serial Bus (USB) Mass Storage control, and more particularly, to a method for controlling power consumption of a USB Mass Storage, an associated personal computer, and a storage medium storing an associated USB Mass Storage driver.

2. Description of the Prior Art

When a USB Mass Storage such as a card reader is electronically connected to a host device such as a personal computer, the host device typically continues to provide the USB Mass Storage with power. If the USB Mass Storage is kept idle for a long period without being utilized by the user, the host device still continues to provide power, causing unnecessary power consumption.

According to the related art, there is no USB selective suspend control available for the USB Mass Storage. Compared to many complicated devices such as cameras and Human Interface Devices (HIDs), the control available for the USB Mass Storage is limited since the USB Mass Storage is typically controlled with the Small Computer System Interface (SCSI) protocol, rather than means of newer standards. As an Operating System (OS) should comply with the SCSI protocol to properly control the USB Mass Storage, even a dominant Operating System (OS) provider can do nothing with the OS.

In a situation where the personal computer is a laptop computer (i.e. the so-called "notebook"), the unnecessary power consumption mentioned above is really an issue since the laptop computer is supplied by a battery. Thus, a novel method is required for reducing the unnecessary power consumption of the USB Mass Storage.

SUMMARY OF THE INVENTION

It is therefore an objective of the present invention to provide a method for controlling power consumption of a Universal Serial Bus (USB) Mass Storage, to provide an associated personal computer, and to provide a storage medium storing an associated USB Mass Storage driver, in order to reduce unnecessary power consumption of the USB Mass Storage.

According to an embodiment of the present invention, a method for controlling power consumption of a USB Mass Storage is provided. The USB Mass Storage is electrically connected to a USB port. The method comprises: monitoring at least one command sent from an operating system (OS) to the USB Mass Storage; and when it is detected that there is no other command, except at least one Test Unit Ready (TUR) command, from the OS to the USB Mass Storage for a predetermined time period, controlling the USB port to enter a suspend mode in order to save power supplied to the USB Mass Storage.

According to an embodiment of the present invention, an associated personal computer is further provided. The personal computer comprises a storage medium storing a USB Mass Storage driver for controlling power consumption of a USB Mass Storage. The USB Mass Storage is electrically connected to a USB port. When the USB Mass Storage driver is executed by the personal computer, the personal computer operates according to a method comprising: monitoring at least one command sent from an OS to the USB Mass Storage; and when it is detected that there is no other command, except at least one TUR command, from the OS to the USB Mass Storage for a predetermined time period, controlling the USB port to enter a suspend mode in order to save power supplied to the USB Mass Storage.

In addition, a storage medium storing an associated USB Mass Storage driver is provided accordingly. The USB Mass Storage driver is utilized for controlling power consumption of a USB Mass Storage. The USB Mass Storage is electrically connected to a USB port. When the USB Mass Storage driver is executed by a personal computer, the personal computer operates according to a method comprising: monitoring at least one command sent from an OS to the USB Mass Storage; and when it is detected that there is no other command, except at least one TUR command, from the OS to the USB Mass Storage for a predetermined time period, controlling the USB port to enter a suspend mode in order to save power supplied to the USB Mass Storage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
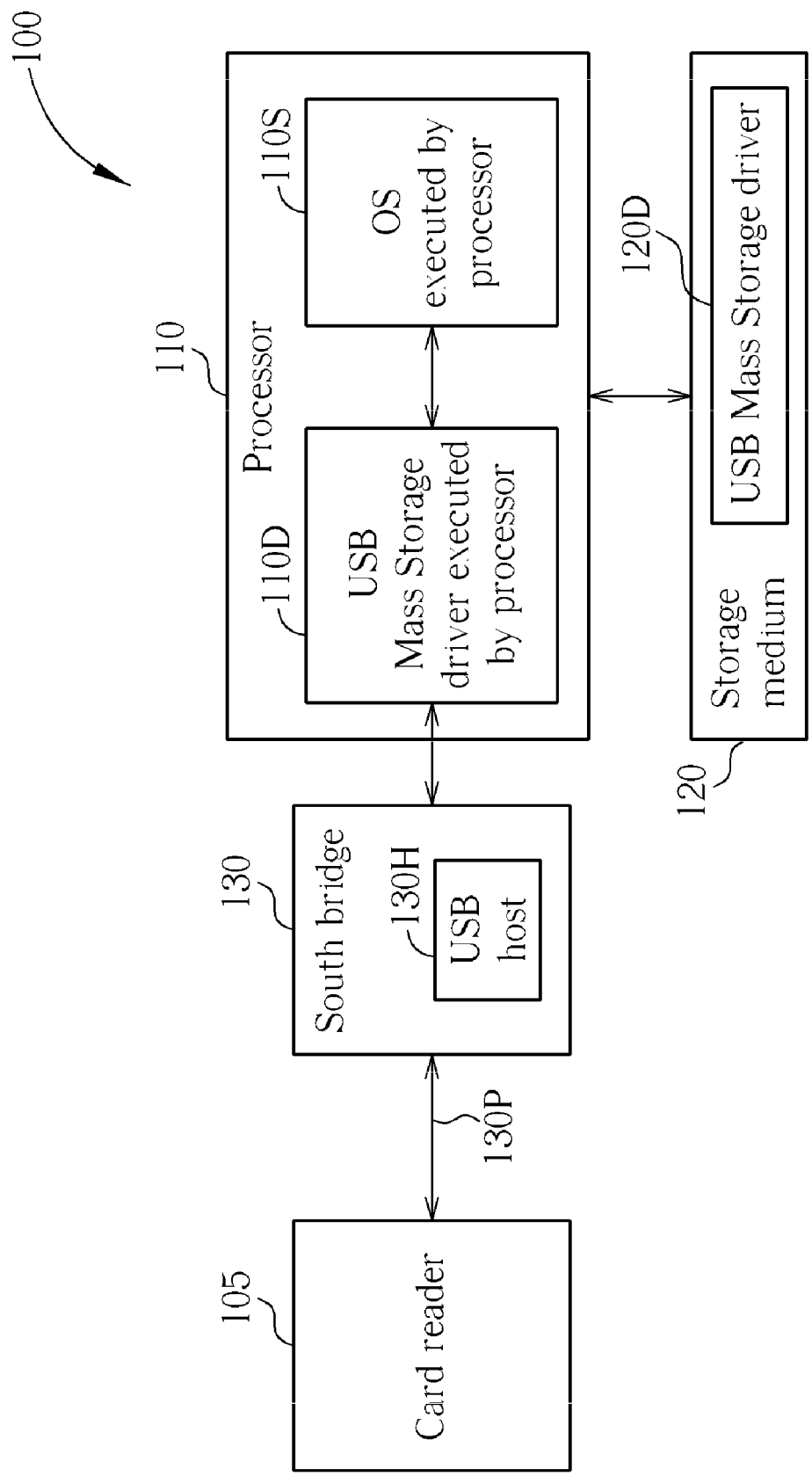
FIG. 1 is a diagram of a personal computer according to a first embodiment of the present invention.

FIG. 1 is a diagram of a personal computer 100 according to a first embodiment of the present invention. For example, the personal computer 100 is a laptop computer. In another example, the personal computer 100 is a desktop computer. As shown in FIG. 1, the personal computer 100 comprises a processor 110, a storage medium 120, a south bridge 130 comprising at least one Universal Serial Bus (USB) host 130H, and a USB Mass Storage electronically connected to a USB port 130P, where the USB Mass Storage of this embodiment is a card reader 105. In other embodiments, the USB Mass Storage can be a hard disk, a compact disc drive or any other USB Mass Storage. The storage medium 120 stores a USB Mass Storage driver 120D for controlling power consumption of the USB Mass Storage, which is the card reader 105 in this embodiment.

The notation 110D is utilized for representing the USB Mass Storage driver 120D read and executed by the personal computer 100, and more particularly, by the processor 110. In addition, the notation 110S is utilized for representing an operating system (OS) executed by the personal computer 100, and more particularly, by the processor 110.

According to this embodiment, the storage medium 120 represents a hard disk (HD). This is for illustrative purposes only, and is not meant to be a limitation of the present invention. According to a variation of this embodiment, the storage medium 120 represents an optical disc accessed by an optical disc drive of the personal computer 100 of this variation. For example, the optical disc can be a Compact Disc-Read Only Memory (CD-ROM) or a CD-Recordable (CD-R). In another example, the optical disc can be a Digital Versatile Disc (DVD) such as a DVD-ROM, a DVD-Recordable (DVD-R) disc, or a DVD+R disc.

According to another variation of this embodiment, the storage medium 120 represents a non-volatile (NV) memory. For example, the storage medium 120 can be a Basic Input Output System (BIOS) ROM. According to another variation of this embodiment, the storage medium 120 represents a non-volatile (NV) memory accessed by an associated interface circuit of the personal computer 100 of this variation. For example, the interface circuit is a Solid State Drive (SDD), and the storage medium 120 is a Flash memory of the SDD. According to another variation of this embodiment, the USB Mass Storage driver 120D can be stored in a storage medium of a portable storage device such as a memory card or a USB flash disk, where the storage medium of this variation is a Flash memory.

Figure 2:
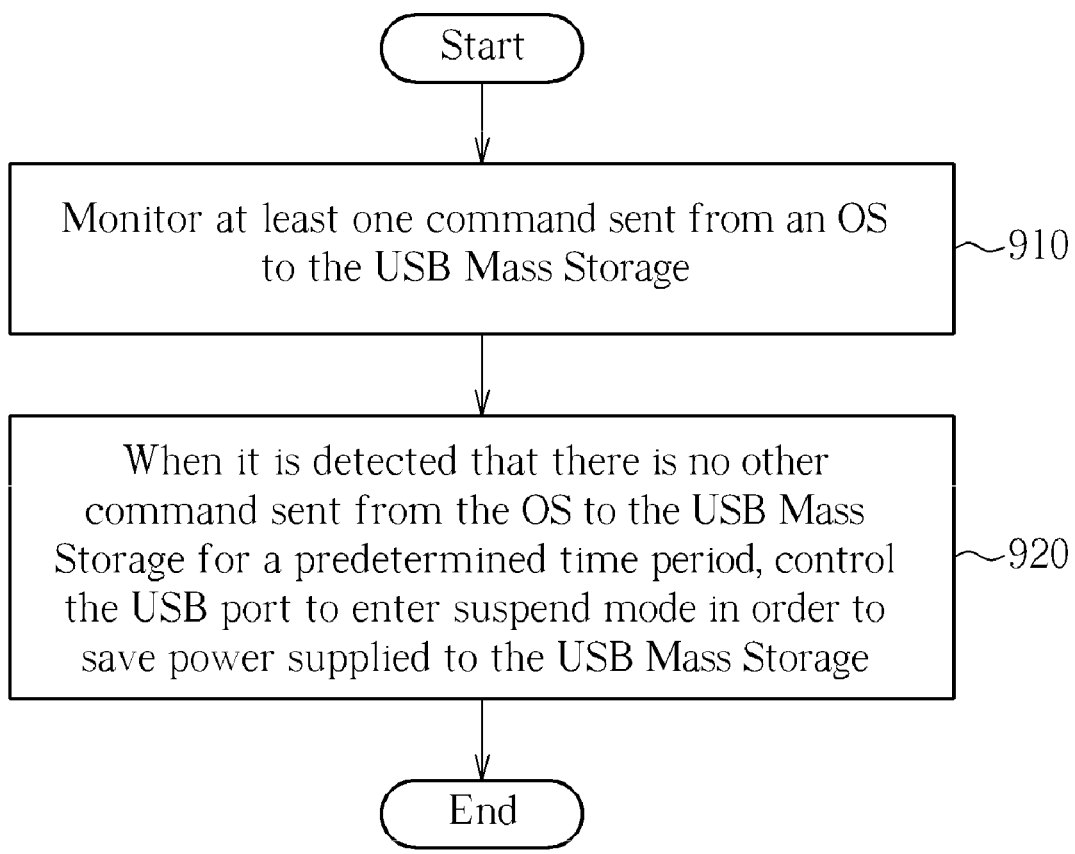
FIG. 2 illustrates a flowchart of a method for controlling power consumption of a Universal Serial Bus (USB) Mass Storage according to an embodiment of the present invention.

FIG. 2 illustrates a flowchart of a method for controlling power consumption of a USB Mass Storage according to an embodiment of the present invention. The method shown in FIG. 2 can be applied to the personal computer 100 shown in FIG. 1. In addition, the method shown in FIG. 2 can be implemented by utilizing the personal computer 100 shown in FIG. 1. More particularly, when the USB Mass Storage driver 120D is executed by the personal computer 100, the personal computer 100 operates according to the method shown in FIG. 2, where the method is described as follows.

In Step 910, the USB Mass Storage driver 110D (labeled "USB Mass Storage driver executed by processor" in FIG. 1) monitors at least one commands, including at least one Test Unit Ready (TUR) command, sent from the OS 110S to the USB Mass Storage (i.e. the card reader 105 in this embodiment), where the TUR command is defined by the Small Computer System Interface (SCSI) protocol.

In Step 920, when it is detected that there is no other command sent from the OS 110S to the USB Mass Storage (e.g. the card reader 105 in this embodiment) for a predetermined time period, except the TUR command, the USB Mass Storage driver 110D controls the USB port 130P to enter a suspend mode in order to save power supplied to the USB Mass Storage (i.e. the card reader 105 in this embodiment).

Figure 3:
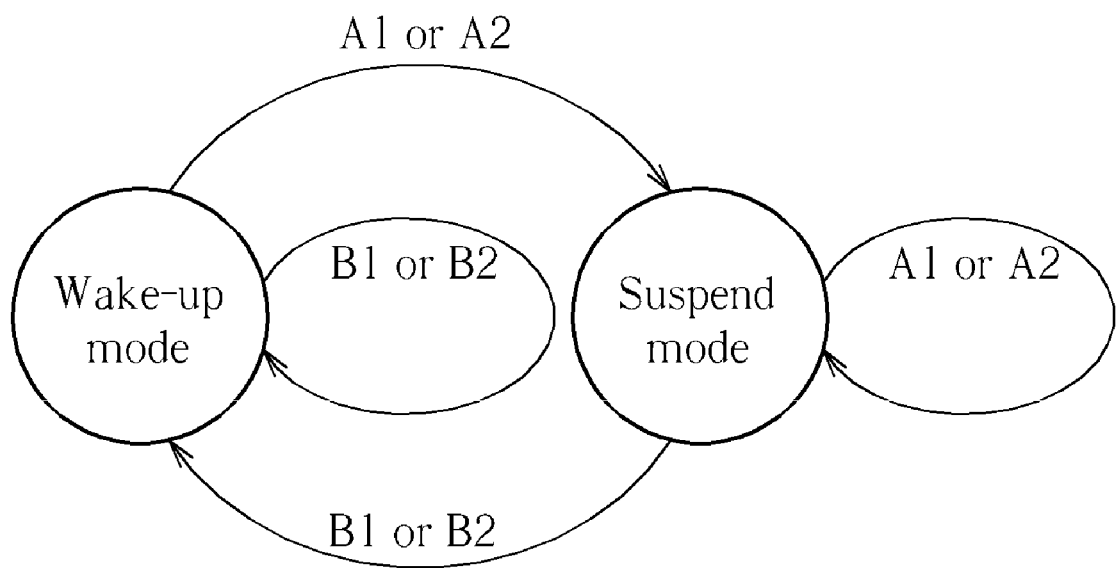
FIG. 3 illustrates a diagram of state transition between a suspend mode and a wake-up mode according to an embodiment of the present invention, where the embodiment is a variation of the embodiment shown in FIG. 2.

FIG. 3 illustrates a diagram of state transition between a suspend mode and a wake-up mode according to an embodiment of the present invention, where the embodiment is a variation of the embodiment shown in FIG. 2. The notation A1 is utilized for representing the criterion mentioned in Step 920, i.e. the criterion that there is no other command sent from the OS 110S to the USB Mass Storage. The notation A2 represents a criterion that at least a TUR command appears during the predetermined time period. In one embodiment, the notation A2 represents a criterion that the TUR command appears regularly during the predetermined time period. Thus, when the criterion A1 or the criterion A2 is satisfied, the USB Mass Storage driver 110D controls the USB port 130P to enter the suspend mode.

That is, when it is detected that there is no other command sent from the OS 110S to the USB Mass Storage (e.g. the card reader 105 in this embodiment) for the predetermined time period or that only the TUR command appears (or more particularly, the TUR command appears regularly) during the predetermined time period, the USB Mass Storage driver 110D controls the USB port 130P to enter the suspend mode in order to save power supplied to the USB Mass Storage (e.g. the card reader 105 in this embodiment).

More particularly, the USB Mass Storage driver 110D determines whether the TUR command appears regularly according to whether a frequency of appearance of the TUR command remains constant during the predetermined time period. For example, the predetermined time period is 180 seconds, and when the frequency of appearance of the TUR command remains one command per second for 180 seconds, the USB Mass Storage driver 110D controls the USB port 130P to enter the suspend mode in order to save power supplied to the USB Mass Storage.

In practice, when the criterion A1 or the criterion A2 is satisfied, the USB Mass Storage driver 110D sends a selective suspend command to the south bridge 130, and more particularly, to the USB host 130H, in order to control the USB port 130P to enter the suspend mode.

In addition, the notation B1 represents a criterion that the TUR command does not appear regularly as usual (or in other words, the appearance frequency of the TUR command changes), and the notation B2 represents a criterion that a command differing from the TUR command appears.

That is, when the USB port 130P is in the suspend mode and it is detected that the TUR command does not appear regularly as usual (or in other words, the appearance frequency of the TUR command changes) or that a command differing from the TUR command appears, the USB Mass Storage driver 110D controls the USB port 130P to enter the wake-up mode in order to wake up the USB Mass Storage (i.e. the card reader 105 in this embodiment).

For example, given that the predetermined time period is 180 seconds, when the frequency of appearance of the TUR command does not remain constant for 180 seconds, the USB Mass Storage driver 110D controls the USB port 130P to enter the wake-up mode in order to wake up the USB Mass Storage. More particularly, when the frequency of appearance of the TUR command increases (e.g. the frequency of appearance of the TUR command reaches five commands per second), the USB Mass Storage driver 110D controls the USB port 130P to enter the wake-up mode in order to wake up the USB Mass Storage.

In practice, as long as neither the criterion B1 nor the criterion B2 is satisfied, the USB Mass Storage driver 110D replies "Fail" in response to the TUR command from the OS 110S.

Please note that both the criterion B1 and the criterion B2 represent that the user probably wants to use the USB Mass Storage mentioned above.

As shown in FIG. 3, the criteria A1, A2, B1, and B2 are all utilized in this embodiment. This is for illustrative purposes only, and is not meant to be a limitation of the present invention. According to a variation of this embodiment, one of the criteria B1 and B2 can be removed. For example, the criterion B1 is removed while the criterion B2 is still utilized. In another example, the criterion B2 is removed while the criterion B1 is still utilized.

According to another variation of this embodiment, one of the criteria A1 and A2 can be removed. For example, the criterion A1 is removed while the criterion A2 is still utilized. In another example, the criterion A2 is removed while the criterion A1 is still utilized. According to another variation of this embodiment, one of the criteria A1 and A2 can be removed while the other is still utilized, and one of the criteria B1 and B2 can be removed while the other is still utilized.

Figure 4:
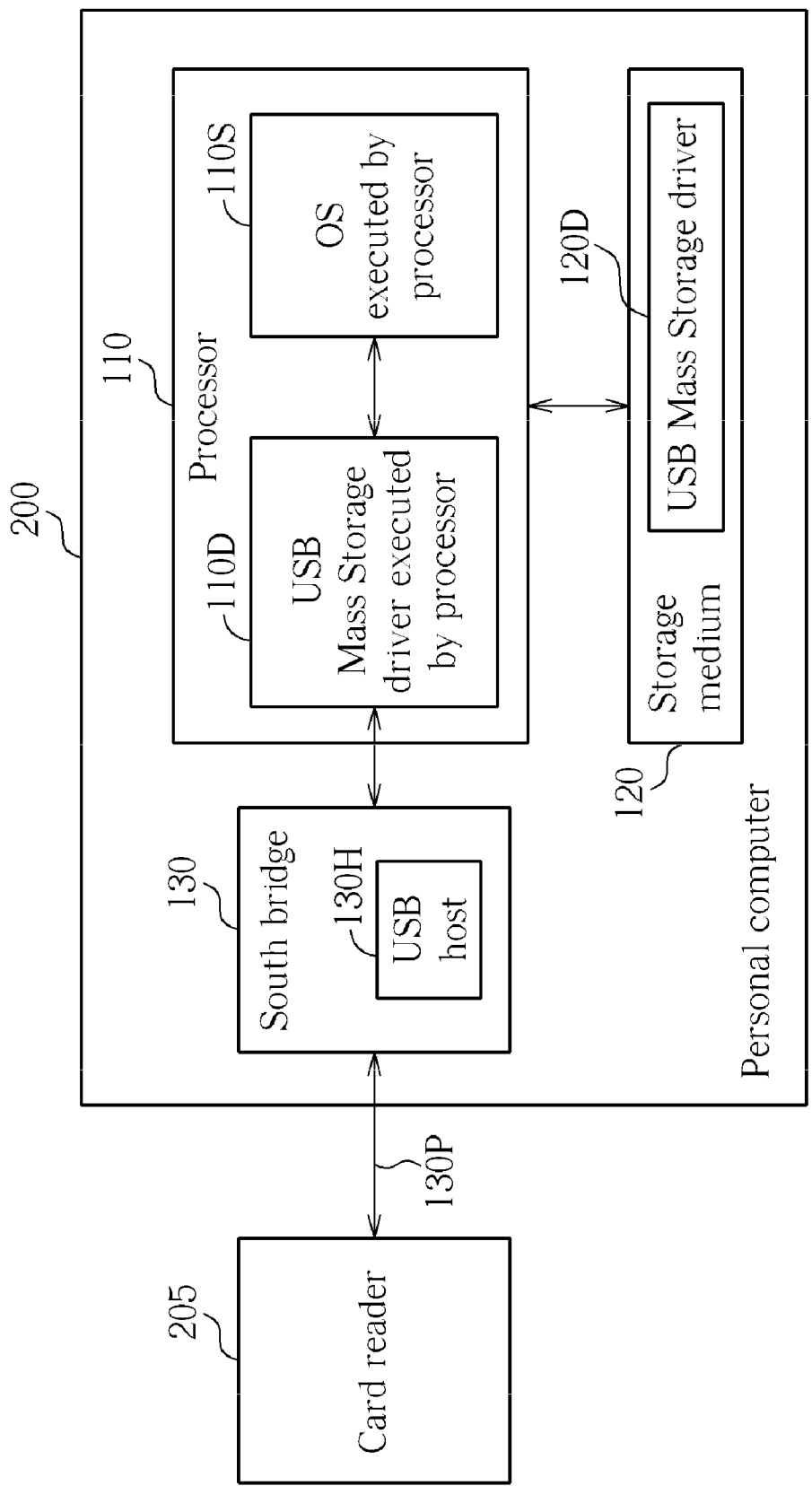
FIG. 4 is a diagram of a personal computer according to a second embodiment of the present invention, where the second embodiment is a variation of the first embodiment.

FIG. 4 is a diagram of a personal computer 200 according to a second embodiment of the present invention, where the second embodiment is a variation of the first embodiment.

Here, the aforementioned card reader 105 is replaced by another card reader 205 that is positioned outside the personal computer 200, where the user can detach the card reader 205 from the USB port 130P of the personal computer 200 when needed. Similar descriptions are not repeated for this embodiment.

In contrast to the related art, the present invention provides practical methods and associated USB Mass Storage drivers respectively corresponding to the methods. By utilizing the present invention methods or the associated USB Mass Storage drivers respectively corresponding to the methods, unnecessary power consumption of the USB Mass Storage can be reduced.

It is another advantage of the present invention that, in a situation where the personal computer is a laptop computer, the present invention methods and the associated USB Mass Storage drivers indeed enhance the performance of the laptop computer by saving the power of the battery thereof.

Those skilled in the art will readily observe that numerous modifications and alterations of the device and method may be made while retaining the teachings of the invention.

What is claimed is:

1. A method for controlling power consumption of a Universal Serial Bus (USB) Mass Storage, the USB Mass Storage being electrically connected to a USB port, the method comprising:
   monitoring at least one command sent from an operating system (OS) to the USB Mass Storage, wherein the step of monitoring the at least one command sent from the OS to the USB Mass Storage is performed in a host comprising the USB port;
   when it is detected that there is no other command, except at least one Test Unit Ready (TUR) command, from the OS to the USB Mass Storage for a predetermined time period, controlling the USB port to enter a suspend mode in order to save power supplied to the USB Mass Storage;
   when the USB port is in the suspend mode and it is detected that the TUR command does not appear regularly as usual, controlling the USB port to enter a wake-up mode in order to wake up the USB Mass Storage; and
   when the USB port is in the suspend mode and it is detected that a frequency of appearance of the TUR command increases, controlling the USB port to enter a wake-up mode in order to wake up the USB Mass Storage.

2. The method of claim 1, further comprising:
   when it is detected that the TUR command appears regularly during the predetermined time period, controlling the USB port to enter the suspend mode in order to save power supplied to the USB Mass Storage.

3. The method of claim 2, further comprising:
   determining whether the TUR command appears regularly according to whether a frequency of appearance of the TUR command remains constant during the predetermined time period.

4. The method of claim 1, further comprising:
   determining whether the TUR command appears regularly according to whether a frequency of appearance of the TUR command remains constant during the predetermined time period.

5. The method of claim 1, further comprising:
   when the USB port is in the suspend mode and it is detected that a command differing from the TUR command appears, controlling the USB port to enter a wake-up mode in order to wake up the USB Mass Storage.

6. The method of claim 1, wherein the USB Mass Storage is a card reader, a hard disk or a compact disc drive.

7. A personal computer, which comprises a storage medium storing a Universal Serial Bus (USB) Mass Storage driver for controlling power consumption of a USB Mass Storage, the USB Mass Storage being electrically connected to a USB port, wherein when the USB Mass Storage driver is executed by the personal computer, the personal computer operates according to a method comprising:
   monitoring at least one command sent from an operating system (OS) to the USB Mass Storage;
   when it is detected that there is no other command, except at least one Test Unit Ready (TUR) command, from the OS to the USB Mass Storage for a predetermined time period, controlling the USB port to enter a suspend mode in order to save power supplied to the USB Mass Storage;
   when the USB port is in the suspend mode and it is detected that the TUR command does not appear regularly as usual, controlling the USB port to enter a wake-up mode in order to wake up the USB Mass Storage; and
   when the USB port is in the suspend mode and it is detected that a frequency of appearance of the TUR command increases, controlling the USB port to enter a wake-up mode in order to wake up the USB Mass Storage.

8. The personal computer of claim 7, wherein the method further comprises:
   when it is detected that the TUR command appears regularly during the predetermined time period, controlling the USB port to enter the suspend mode in order to save power supplied to the USB Mass Storage.

9. The personal computer of claim 8, wherein the method further comprises:
   determining whether the TUR command appears regularly according to whether a frequency of appearance of the TUR command remains constant during the predetermined time period.

10. The personal computer of claim 7, wherein the method further comprises:
    determining whether the TUR command appears regularly according to whether a frequency of appearance of the TUR command remains constant during the predetermined time period.

11. The personal computer of claim 7, wherein the method further comprises:
    when the USB port is in the suspend mode and it is detected that a command differing from the TUR command appears, controlling the USB port to enter a wake-up mode in order to wake up the USB Mass Storage.

12. The personal computer of claim 7, wherein the personal computer is a laptop computer.

13. The personal computer of claim 7, wherein the USB Mass Storage is a card reader, a hard disk or a compact disc drive.

14. A storage medium storing a Universal Serial Bus (USB) Mass Storage driver for controlling power consumption of a USB Mass Storage, the USB Mass Storage being electrically connected to a USB port, wherein when the USB Mass Storage driver is executed by a personal computer, the personal computer operates according to a method comprising:
    monitoring at least one command sent from an operating system (OS) to the USB Mass Storage;
    when it is detected that there is no other command, except at least one Test Unit Ready (TUR) command, from the OS to the USB Mass Storage for a predetermined time period, controlling the USB port to enter a suspend mode in order to save power supplied to the USB Mass Storage;

when the USB port is in the suspend mode and it is detected that the TUR command does not appear regularly as usual, controlling the USB port to enter a wake-up mode in order to wake up the USB Mass Storage; and when the USB port is in the suspend mode and it is detected that a frequency of appearance of the TUR command increases, controlling the USB port to enter a wake-up mode in order to wake up the USB Mass Storage.

15. The storage medium of claim 14, wherein the method further comprises:

when it is detected that the TUR command appears regularly during the predetermined time period, controlling the USB port to enter the suspend mode in order to save power supplied to the USB Mass Storage.

16. The storage medium of claim 14, wherein the method further comprises:

determining whether the TUR command appears regularly according to whether a frequency of appearance of the TUR command remains constant during the predetermined time period.

17. The storage medium of claim 14, wherein the method further comprises:

when the USB port is in the suspend mode and it is detected that a command differing from the TUR command appears, controlling the USB port to enter a wake-up mode in order to wake up the USB Mass Storage.

18. The storage medium of claim 14, wherein the USB Mass Storage is a card reader, a hard disk or a compact disc drive.

* * * * *